(12) United States Patent
Paping

(10) Patent No.: US 6,821,573 B1
(45) Date of Patent: Nov. 23, 2004

(54) FLEXIBLE LAMINATE AND METHOD OF MANUFACTURING SAME

(75) Inventor: Max G. Paping, St. Michielsgestel (NL)

(73) Assignee: Budev B.V., St. Michielsgestel (NL)

( * ) Notice: Subject to any disclaimer, the term of this patent is extended or adjusted under 35 U.S.C. 154(b) by 0 days.

(21) Appl. No.: 09/700,184

(22) PCT Filed: May 4, 1999

(86) PCT No.: PCT/NL99/00266
§ 371 (c)(1),
(2), (4) Date: Jan. 24, 2001

(87) PCT Pub. No.: WO99/59123
PCT Pub. Date: Nov. 18, 1999

(30) Foreign Application Priority Data

May 11, 1998 (NL) .............................. 1009129

(51) Int. Cl.⁷ .............................................. B32B 31/00
(52) U.S. Cl. ....................... 427/547; 427/550; 427/129; 427/130; 427/208.2; 428/693; 116/28 R; 40/600; 40/661.01; 40/903
(58) Field of Search ................................ 428/692, 693, 428/900; 116/28 R; 40/591, 600, 661.01, 903; 427/547, 550, 129, 130, 208.2

(56) References Cited

U.S. PATENT DOCUMENTS

| | | | | |
|---|---|---|---|---|
| 2,599,047 A | * | 6/1952 | Clark | |
| 2,957,261 A | * | 10/1960 | Moskowitz | |
| 3,078,183 A | * | 2/1963 | Karalus | |
| 3,372,503 A | * | 3/1968 | Weeks | |
| 3,670,438 A | * | 6/1972 | Carroll et al. | |
| 4,047,802 A | * | 9/1977 | Pieters | |
| 4,310,978 A | * | 1/1982 | Stern | |
| 4,663,874 A | | 5/1987 | Sano | |
| 4,708,380 A | | 11/1987 | Cruz | |
| 4,713,273 A | * | 12/1987 | Freedman | 428/40 |
| 4,833,018 A | | 5/1989 | Ruehl | |
| 5,005,306 A | | 4/1991 | Kinstler | |
| 5,031,347 A | * | 7/1991 | Berg | 40/591 |
| 5,156,274 A | * | 10/1992 | Williams, Jr. et al. | |
| 5,226,792 A | * | 7/1993 | Darago | |
| 5,312,145 A | | 5/1994 | McNeil | |
| 5,398,437 A | * | 3/1995 | Bump, Jr. et al. | |
| 5,503,891 A | * | 4/1996 | Marshall et al. | |
| 5,549,938 A | * | 8/1996 | Nesbitt | |
| 6,178,676 B1 | * | 1/2001 | Lund | 40/591 |

FOREIGN PATENT DOCUMENTS

| | | |
|---|---|---|
| DE | 1221568 B | 4/1917 |
| GB | 2315367 | 1/1998 |
| WO | 93/22137 | 11/1993 |

* cited by examiner

*Primary Examiner*—Stevan A. Resan
(74) *Attorney, Agent, or Firm*—Banner & Witcoff Ltd.

(57) ABSTRACT

A flexible laminate, comprising: the light-active second layer acts without external energizing to change the properties of incident light such that the light reflected by this layer has signaling properties; a first layer serving as carrier layer; a light-active second layer situated on an outer surface of this laminate; and a permanent magnetic third layer for releasable magnetic attachment of the laminate to a ferromagnetic surface. The laminate has the feature that the light-active second layer acts without external energizing to change the properties of incident light such that the light reflected by this layer has signaling properties.

12 Claims, 1 Drawing Sheet

FLEXIBLE LAMINATE AND METHOD OF MANUFACTURING SAME

BACKGROUND OF THE INVENTION

In the case of, for instance, engine trouble in a car, traffic safety requires the placing of a so-called warning triangle at a distance behind this car. Such warning triangles are mechanical structures which are carried folded up in the car and which must be placed vertically on the road with a special collapsible foot. Such warning triangles are heavy and, with a view to practical handling, take a relatively small form, whereby their optical effect is limited, even in the case of substantial reflective properties.

Seen as a further drawback of known warning triangles is that once the engine trouble has been repaired the warning triangle is often left behind, so that a new one has to be purchased.

In addition, structures placed freely on a foot are subject to wind influences. It often occurs that a warning triangle cannot be placed stably due to strong wind.

BRIEF DESCRIPTION OF THE INVENTION

The invention has the general object of providing solutions to the stated problems.

The invention further has the general object of providing products which can be used for the most diverse applications, and not only as warning triangles, and which are not subject to any of the said problems described above with reference to warning triangles.

BRIEF DESCRIPTION OF THE DRAWINGS

The invention will be further described, by way of examples, with reference to the accompanying drawings, wherein.

DETAILED DESCRIPTION OF THE INVENTION

Figure 1:
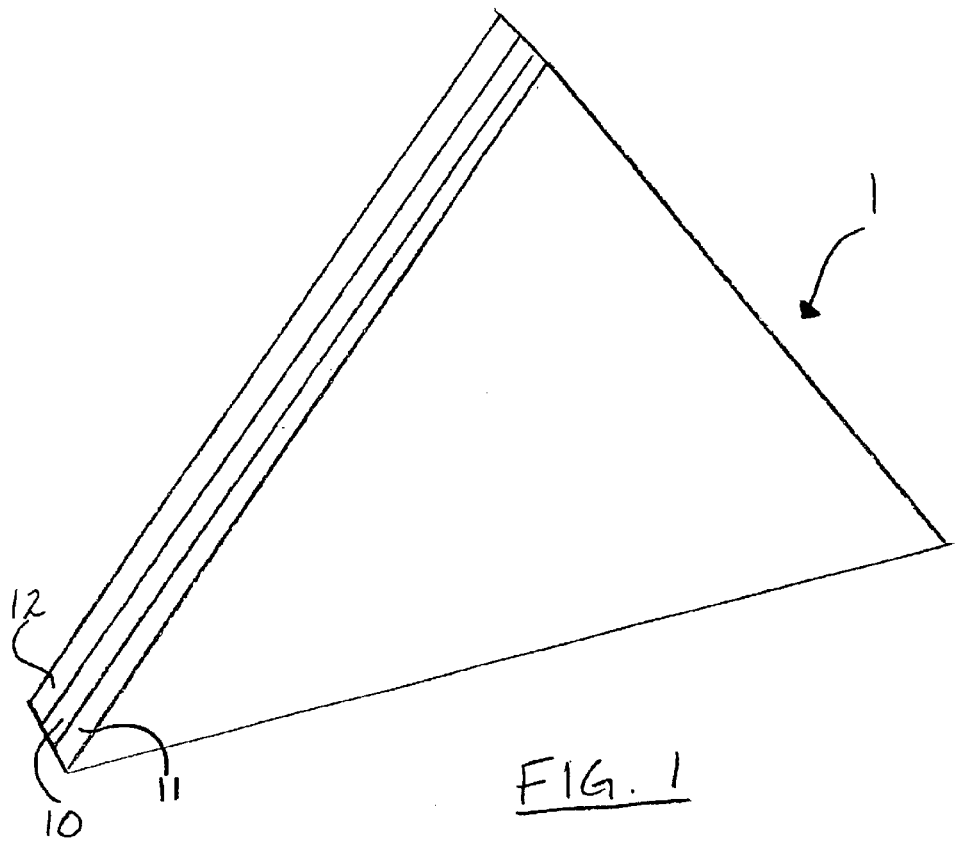
FIG. 1 is a perspective view of a triangular warning device showing the three layer construction.

In respect of the above, and as shown in FIG. 1, the invention provides a flexible laminate, generally designated 1, comprising:
 a first layer 10 serving as carrier layer;
 a light-active second layer 11 situated on an outer surface of this laminate; and
 a permanent magnetic third layer 12 for releasable magnetic attachment of the laminate to a ferromagnetic surface.

Such a laminate is known from U.S. Pat. No. 5,005,306.

The optical properties of the light-active layer as according to this American patent specification have to be activated by external electrical energizing. This limits easy use of this laminate.

With this in mind, the laminate according to the invention has the feature that the light-active second layer acts without external energizing to change the properties of incident light such that the light reflected by this layer has signaling properties.

Such a laminate according to the invention can easily be rolled up and transported in a vehicle in rolled-up state and be unrolled when use is required, whereafter it can be temporarily adhered with a number of very simple hand movements at any desired location to a ferromagnetic part of the surface of the vehicle. The laminate cannot be left behind after use since it forms a temporary unit with the vehicle. It can be placed on and removed from the vehicle very simply and without even the slightest damage.

Figure 2:
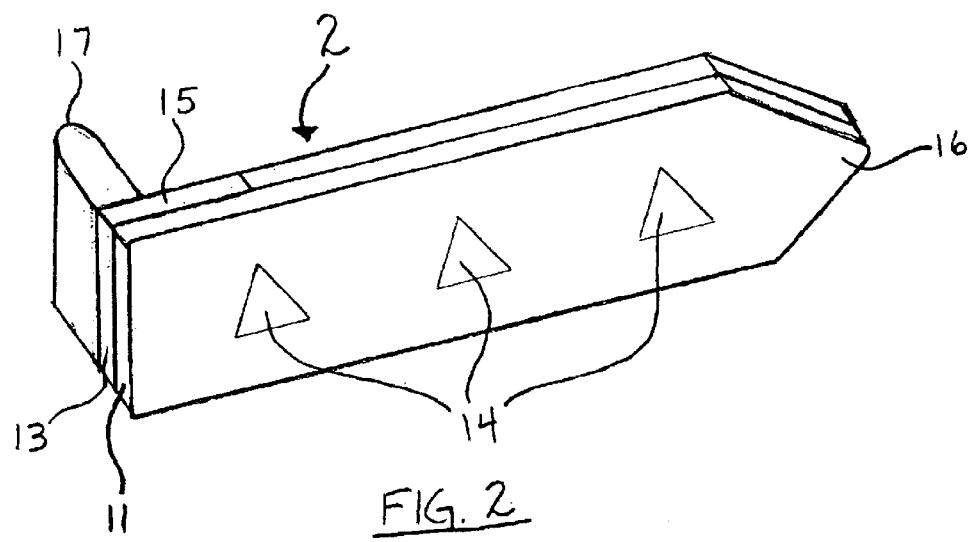
FIG. 2 is a side view of the alternative two layer construction, also showing two additional structural modifications.

The carrier layer serves to impart the required mechanical strength to the laminate, as shown in FIG. 2. A practical embodiment, generally designated 2, has the special feature that the first layer 10 incorporates the properties of the third layer 12 providing a combination layer 13. A prerequisite here is of course that the permanent magnetic third layer has a sufficiently great mechanical strength. This can be achieved in simple manner by making use of a flexible plastic or rubber-like material in which magnetic means are embedded. Such magnetic means can take the form of permanent magnets or a ferromagnetic and pre-magnetized powder.

A variant has the special feature that the second layer is arranged locally in distributed zones.

Particularly in the case of warning systems a pattern of light-active zones 14 visually separated from each other can be advantageous.

In order to achieve a very great mechanical strength the laminate can have the special feature that the first layer comprises a textile fabric or non-woven material.

A practical embodiment has the special feature that the layers are mutually adhered by respective glue layers.

A specific embodiment of the laminate according to the invention has the special feature that the second layer is (photo-) luminescent. Such an embodiment can independently radiate light in dark conditions without this being a direct reaction to incident light. Such an embodiment generally has the drawback that the light intensity is relatively low.

Another embodiment has the special feature that the second layer is light-reflecting. Such an embodiment is for instance very suitable for applications related to that of known warning triangles.

A specific embodiment has the special feature that the second layer has at least one chosen color, for instance a warning color, a pattern of contrasting colors or the like. In the case of a warning triangle the color in question can for instance be red, optionally in combination with other colors such as blue, yellow or orange. The pattern of contrasting colors can for instance comprise the colors red and white.

To enable easy removal of the laminate according to the invention after use, it can advantageously have the special feature that the laminate comprises an edge or end zone 15 without permanent magnetization.

An advantageous embodiment has the special feature that the magnetization of the third layer has an anisotropic character. Such a laminate can be rolled up easily without the layers becoming attached to each other.

In the case of use as safety provision in cars, for instance as warning triangle, the laminate according to the invention can advantageously have the special feature that at least one edge zone displays an aerodynamically acting form 16 tapering toward its free edge. This can effectively prevent passing cars from causing an air flow along the laminate arranged on the car such that it is pulled loose of the car.

A preferred embodiment has the special feature that the laminate is modeled to a desired shape, for instance an elongate strip, the general shape of a road sign, a warning triangle or the like. An elongate strip can be embodied in any desired color or combinations thereof and be arranged in any desired, for instance wholly random manner on a car stopped on a road. This provides a very strong warning function. A warning triangle can be formed by punching the relevant shape from a larger piece of laminate, while alternatively three wide strips can be mutually connected by glueing or in other suitable manner.

In order to prevent a laminate according to the invention being stolen by another person, it can advantageously have the special feature that the laminate has a form such that at least one end can be clampingly secured between a door or a window of a vehicle and is optionally with a widened part. The arrangement of a widened portion 17 on one end can have the advantage that the widened portion cannot pass through the connection between window, door on the one hand and the recess on the other. In order to prevent malicious persons being able to remove the laminate by cutting, it could optionally be provided with a strengthening wire, for instance a steel wire. Such a wire cannot be cut through easily.

The invention further provides a method of manufacturing a laminate in accordance with the above stated specifications. Such a method comprises the steps of:

a) providing the first layer, the second layer and the third layer, which first and third layers are optionally the same;

b) permanently connecting these layers to each other.

A specific embodiment of this method comprises the step of:

c) performing step (b) by stitching, welding, glueing with a pressure-sensitive glue, glueing with a thermally-activated glue or hot melt, or the like.

A very practical embodiment of this latter variant comprises the step of:

d) performing step (c) by using a thermally-activated glue layer and performing step (a) by providing a magnetizable and not, at least not substantially, magnetized layer, carrying the pre-laminate formed by the layers placed onto one another through a heating device so as to activate the glue layer, carrying the heated pre-laminate through the pinch of pressure rollers and magnetizing the magnetizable layer in the heated state of the pre-laminate.

According to another aspect of the invention a method is embodied such that it comprises the step of:

e) manufacturing the laminate by co-extruding at least two layers.

A significant advantage of the laminate according to the invention is that because of its flexibility it can adjust itself easily to the surface to which it is attached. The laminate is therefore given a relatively flat and flexible form. During production it is formed into the required shapes, for instance by punching, cutting or the like. Strips of the laminate can have standard lengths of for instance 0.1–2 m.

A laminate according to the invention can be supplied for diverse applications in just as many shapes and widths. The laminate is also very suitable to serve as marking for special parts of a crash-barrier, for instance to signpost bends, in which case different colors can be used which together indicate a direction.

Such a direction indicator can for instance be a pattern of successive zones with generally chevron shapes which indicate the direction of the bend and have for instance the alternating colors red-white-red-white and so on.

Diverse per se known products are suitable as permanent magnetic layer. These are for instance the magnetic foils of the company Bakker Magnetics B. V., Son, the Netherlands, which foils belong to the group with the type specifications BM200, BM700 and BM701.

What is claimed is:

1. Method of manufacturing a laminate comprising a first flexible carrier layer, a second light-active layer and a third flexible magnetic layer wherein the light-active second layer is a reflective layer having signaling properties and acts without external energizing to change the properties of incident light, and the size and shape of the flexible carrier first layer, the light-active second layer, and the flexible permanent magnetic layer are the same; the method comprising the steps of:

a) providing a magnetizable layer, b) forming a pre-laminate comprising the second light-active layer, a first thermally-activated glue layer, the first flexible carrier layer, a second thermally-activated glue layer, and the magnetizable layer;

c) permanently connecting the second light-active layer to one side of the first layer and the third magnetizable layer to the other side of the first layer by heating the pre-laminate in a heating device to activate the glue layers, carrying the pre-laminate through pressure rollers, and magnetizing the magnetizable layer.

2. The method of claim 1 wherein the laminate is an elongate strip.

3. The method of claim 1 wherein the second layer has a pattern of light-active zones.

4. The method of claim 1 wherein the first layer comprises a textile fabric or non-woven material.

5. The method of claim 1 wherein the second layer is photo luminescent.

6. The method of claim 1 wherein the second layer is diffusely light-reflecting.

7. The method of claim 1 wherein the second layer has at least one color, or a pattern of contrasting colors.

8. The method of claim 1 further comprising providing an edge without permanent magnetization.

9. The method of claim 1 wherein the magnetization of the flexible permanent magnetic layer has an anisotropic character.

10. The method of claim 1 further comprising providing an aerodynamic edge tapering toward the end of the laminate.

11. The method of claim 1 wherein the laminate is an elongate strip, the shape of a road sign, or a warning triangle.

12. The method of claim 11 wherein one end of the laminate can be clampingly secured between a door or a window of a vehicle with or without a widened portion.

* * * * *